(12) United States Patent
Chu et al.

(10) Patent No.: US 11,748,773 B2
(45) Date of Patent: *Sep. 5, 2023

(54) IDENTIFYING GEOGRAPHIC MARKET SHARE

(71) Applicant: International Business Machines Corporation, Armonk, NY (US)

(72) Inventors: Linsong Chu, White Plains, NY (US); Karina Elayne Kervin, Albany, NY (US); Michael Khayyat, New York, NY (US); Hongfei Li, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

This patent is subject to a terminal disclaimer.

(21) Appl. No.: 16/445,574

(22) Filed: Jun. 19, 2019

(65) Prior Publication Data

US 2019/0333086 A1  Oct. 31, 2019

Related U.S. Application Data

(63) Continuation of application No. 15/962,218, filed on Apr. 25, 2018, now abandoned.

(51) Int. Cl.
| | |
|---|---|
| *G06Q 10/00* | (2023.01) |
| *G06Q 30/0204* | (2023.01) |
| *G06Q 30/0201* | (2023.01) |
| *H04W 4/029* | (2018.01) |
| *H04W 4/021* | (2018.01) |

(52) U.S. Cl.
CPC ..... *G06Q 30/0205* (2013.01); *G06Q 30/0201* (2013.01); *H04W 4/021* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 8,306,846 | B2 | 11/2012 | Tavares et al. |
| 8,655,708 | B2 | 2/2014 | Spagnolo |
| 8,655,726 | B1 | 2/2014 | Favero et al. |
| 8,731,992 | B1 | 5/2014 | Anthony et al. |

(Continued)

FOREIGN PATENT DOCUMENTS

EP  2308217 B1  5/2016

OTHER PUBLICATIONS

Market Share Analysis, Nov. 21, 2012, DFWHC Foundation, https://dfwhcfoundation.org/market-share-analysis/, p. 1-4. (Year: 2012).*

(Continued)

*Primary Examiner* — Joseph M Waesco
(74) *Attorney, Agent, or Firm* — Robert A. Voigt, Jr.; Shackelford, Bowen, Mckinley & Norton, LLP

(57) ABSTRACT

A method, system and computer program product for identifying a geographic market share. Mobility data is acquired from applications running on mobile devices of users located within a geographic area. Mobility data is then used to infer shopping habits within the geographic area. Geo-demographic profiles are then created. The geographic market share is then determined using the created geo-demographic profiles.

7 Claims, 8 Drawing Sheets

(56) References Cited

U.S. PATENT DOCUMENTS

| | | | |
|---|---|---|---|
| 8,959,098 B2 | 2/2015 | Skibiski et al. | |
| 9,165,304 B2 | 10/2015 | Weiss et al. | |
| 9,299,027 B2 | 3/2016 | Smith et al. | |
| 9,516,470 B1 | 12/2016 | Scofield et al. | |
| 9,589,270 B2 | 3/2017 | Weiss et al. | |
| 10,248,700 B2* | 4/2019 | Diamond | G06F 16/26 |
| 2002/0046104 A1 | 4/2002 | Kaddeche et al. | |
| 2003/0033195 A1* | 2/2003 | Bruce | G06Q 30/0205 705/7.34 |
| 2003/0115216 A1* | 6/2003 | Moore | G06Q 10/0637 |
| 2003/0195806 A1* | 10/2003 | Willman | G06Q 30/02 705/14.35 |
| 2007/0124159 A1* | 5/2007 | Moore | G06Q 30/02 705/7.36 |
| 2007/0130090 A1* | 6/2007 | Staib | G06Q 30/0222 705/14.69 |
| 2009/0018996 A1* | 1/2009 | Hunt | G06Q 30/02 |
| 2009/0276290 A1* | 11/2009 | Sill | G06Q 10/06393 707/999.005 |
| 2010/0161376 A1* | 6/2010 | Spagnolo | G06Q 10/00 705/7.34 |
| 2010/0191723 A1* | 7/2010 | Perez | G06Q 30/02 707/723 |
| 2011/0022467 A1 | 1/2011 | Carney, II et al. | |
| 2011/0191140 A1* | 8/2011 | Newman | G06Q 30/0202 705/7.31 |
| 2012/0052871 A1 | 3/2012 | Cochran et al. | |
| 2012/0084118 A1* | 4/2012 | Bai | G06Q 30/0202 705/7.31 |
| 2013/0006705 A1* | 1/2013 | Votaw | G06Q 30/0259 705/7.29 |
| 2013/0046738 A1* | 2/2013 | Kuo | G01C 21/3682 707/690 |
| 2013/0103462 A1* | 4/2013 | Carpenter | G06Q 30/0249 705/14.3 |
| 2013/0103475 A1* | 4/2013 | Carpenter | G06Q 30/0224 705/14.27 |
| 2013/0191361 A1* | 7/2013 | Yu | G06Q 30/0256 707/706 |
| 2014/0058794 A1* | 2/2014 | Malov | G06Q 10/083 705/7.31 |
| 2014/0095260 A1* | 4/2014 | Weiss | G06Q 30/0207 705/7.32 |
| 2014/0180767 A1 | 6/2014 | Villars | |
| 2014/0244349 A1* | 8/2014 | King | G06Q 30/0201 705/7.29 |
| 2014/0304038 A1 | 10/2014 | Milton et al. | |
| 2015/0339686 A1 | 11/2015 | Garcia et al. | |
| 2016/0092895 A1* | 3/2016 | Grossman | G06Q 30/0204 705/7.33 |
| 2017/0061488 A1* | 3/2017 | Ilminen | H04W 4/029 |
| 2017/0076158 A1* | 3/2017 | Diamond | G06K 9/6298 |
| 2017/0091795 A1* | 3/2017 | Mansour | G06Q 30/0205 |
| 2017/0206223 A1* | 7/2017 | Bell | G06F 16/951 |
| 2017/0323261 A1* | 11/2017 | Jones | B64C 39/024 |
| 2018/0075468 A1* | 3/2018 | Pydynowski | G06Q 30/0204 |
| 2019/0005424 A1* | 1/2019 | Gonguet | G06Q 50/01 |

OTHER PUBLICATIONS

Wikipedia, "Market Share," https://en.wikipedia.org/wiki/Market_share, 2016, pp. 1-2.
Investopedia, "Market Share," https://www.investopedia.com/terms/m/marketshare.asp, 2016, one page.
Wikipedia, "Market Share Analysis," https://en.wikipedia.org/wiki/Market_share_analysis, 2016, pp. 1-2.
United States Census Bureau, "TIGER/Line® with Selected Demographic and Economic Data," http://www.census.gov/geo/maps-data/data/tiger-data.html, 2016, pp. 1-2.
Chris Veness, "Movable Type Scripts," http://www.movable-type.co.uk/scripts/geohash.html, 2016, pp. 1-6.
Wray et al., "Mobile Advertising Engine for Centralized Mobile Coupon Delivery," International Journal of Management and Marketing Research, vol. 4, No. 1, 2011, pp. 75-85.
List of IBM Patents or Patent Applications Treated as Related, Jul. 8, 2019, pp. 1-2.
Office Action for U.S. Appl. No. 15/962,218 dated Dec. 13, 2019, pp. 1-32.
Final Office Action for U.S. Appl. No. 15/962,218 dated May 1, 2020, pp. 1-34.
Office Action for U.S. Appl. No. 15/962,218 dated Dec. 14, 2020, pp. 1-25.
Office Action for U.S. Appl. No. 15/962,218 dated Apr. 2, 2021, pp. 1-27.

* cited by examiner

IDENTIFYING GEOGRAPHIC MARKET SHARE

TECHNICAL FIELD

The present invention relates generally to analyzing market share, and more particularly to identifying the geographic market share of businesses.

BACKGROUND

Businesses often utilize customer analytics systems to determine the businesses' market share. Market share is the percentage of a market (defined in terms of either units or revenue) accounted for by a specific entity.

Currently though, there is not a single best technique utilized by customer analytics systems for calculating market share due to variations in the definition of what constitutes the market (one of the many varieties of systems, institutions, procedures, social relations and infrastructures whereby parties engage in exchange) as well as measurement errors.

Furthermore, in connection with market share analysis (indicating how well a business is doing in the marketplace compared to its competitors), customer analytics systems utilize various factors to help estimate the value of the market share, such as unit or dollar sales, user base (piracy and brand switching effect), market definition (scope of definitions), the scope of the denominator (which other brands included), time frame length and product definition (brand, product line or strategic business unit). In particular, current customer analytics systems mainly rely upon surveys and transaction data to estimate the value of the market share, which is very computation intensive. Furthermore, surveys are very time-intensive to prepare and analyze and subject to human error.

Such market share analysis performed by customer analytics systems though fails to provide the business an understanding of their competitors' customers and sales, both demographically and geographically. Furthermore, such analysis fails to provide the business an understanding of the amount of overlap of their own customers with their competitors' customers geographically. That is, current customer analytics systems fail to provide a business a complete understanding of its geographic market share. Such information is valuable to a business in order to possibly identify new business opportunities.

Currently, customer analytics systems expend an inordinate amount of computing resources (e.g., processing resources) in attempting to identify new business opportunities using standard market share analysis discussed above, due in part, to the substantial reliance upon surveys and transaction data, which are computation intensive, to perform a market share analysis. Furthermore, current customer analytics systems fail to provide the business an understanding of its geographic market distribution and its competitors despite utilizing an excessive amount of computing resources.

SUMMARY

In one embodiment of the present invention, a method for identifying a geographic market share comprises receiving location data of businesses in a geographic area, where the businesses comprise a target business and one or more competitors of the target business. The method further comprises identifying locations of the target business and the one or more competitors in the geographic area using the received location data of businesses. The method additionally comprises receiving mobility data from a plurality of mobile devices located in the geographic area. Furthermore, the method comprises identifying people who are shopping at the identified locations of the target business and the one or more competitors using the mobility data. Additionally, the method comprises inferring shopping habits of the identified people using the mobility data. In addition, the method comprises identifying customers of the target business and the one or more competitors using the mobility data and customer data from the target business. The method further comprises determining areas in the geographic area where the customers of the target business and the one or more competitors live, work and commute using the mobility data and the inferred shopping habits of the identified people. The method additionally comprises creating geo-demographic profiles of the customers of the target business and the one or more competitors using the determined areas in the geographic area where the customers of the target business and the one or more competitors live, work and commute. Furthermore, the method comprises determining geographic market share of the target business and the one or more competitors within the geographic area using the created geo-demographic profiles of customers of the target business and the one or more competitors. Additionally, the method comprises presenting a visualization of the geographic market share of the target business and the one or more competitors within the geographic area.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for identifying a geographic market share. In one embodiment of the present invention, a customer analytics system acquires mobility data from applications running on mobile devices of users located within a geographic area. "Mobility data," as used herein, refers to data pertaining to the movement of the users of the mobile devices, such as within a geographic area, thereby learning which stores are visited by the user within a certain geographic area, including the time at which such stores are visited, the duration of time spent at each store and even when such stores are visited in light of the weather at the time of visitation (can be obtained from various databases or websites that provide weather information). The customer analytics system uses the mobility data to infer shopping habits of people who shop at locations for the target business and its competitors within a geographic area. Furthermore, the customer analytics system identifies customers of the target business and its customers using the mobility data and customer data from the target business. The particular areas in the geographic area where the customers of the target business and its competitors live, work and commute are determined using the mobility data and the inferred shopping habits of the people. Geo-demographic profiles of the customers of the target business and its competitors are then created by the customer analytics system using these determined areas in the geographic area where the customers of the target business and its competitors live, work and commute. The customer analytics system then determines the geographic market share of the target business and its competitors within the geographic area using the created geo-demographic profiles of the customers of the target business and its competitors. A visualization of the geographic market share of the target business and its competitors within the geographic area may then be presented by the customer analytics system. In this manner, the present invention enhances businesses' understanding of its geographic market share using mobility data.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
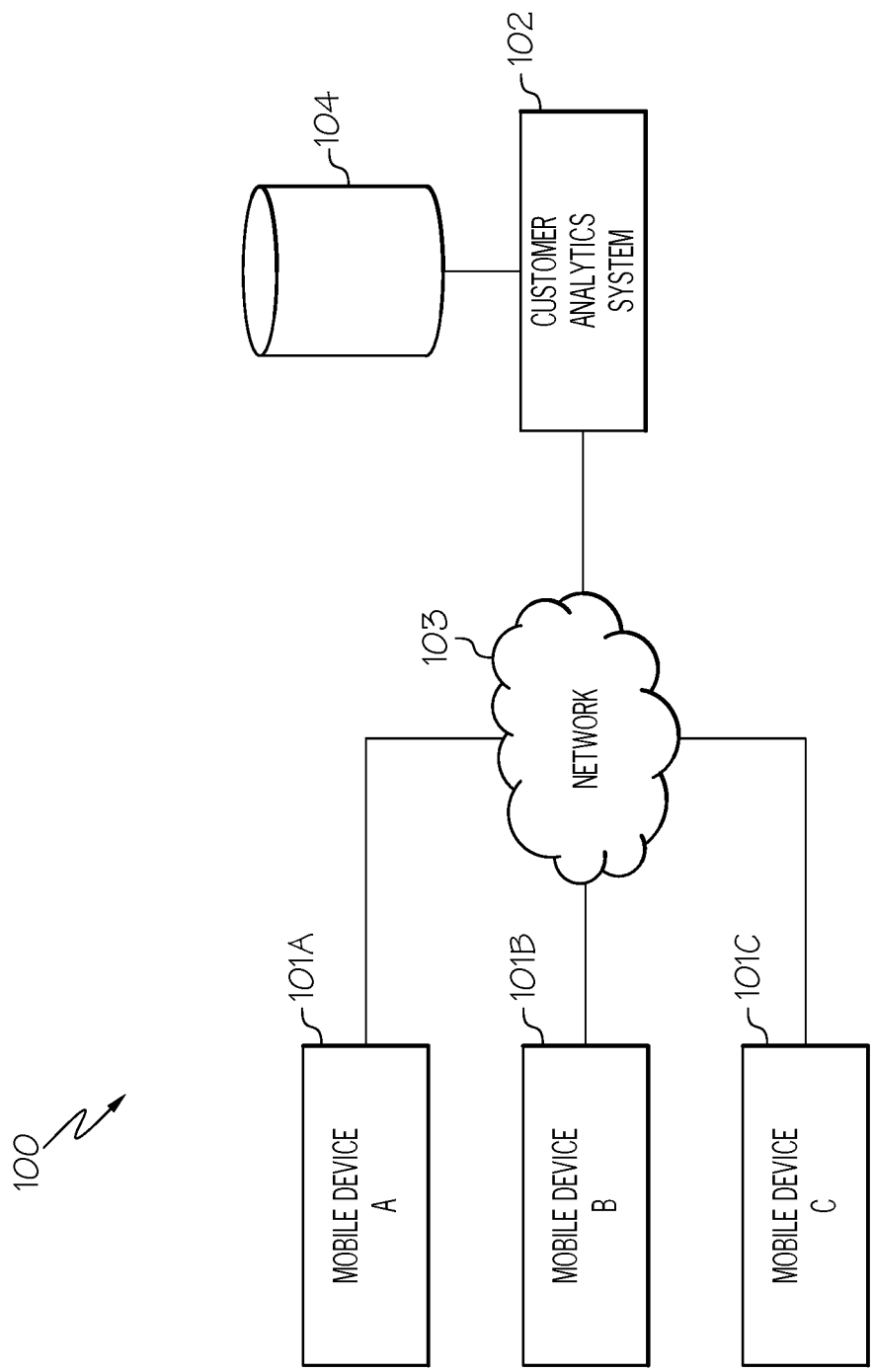
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes mobile devices 101A-101C (identified as "Mobile Device A," "Mobile Device B," and "Mobile Device C," respectively, in FIG. 1) connected to customer analytics system 102 via a network 103. Mobile devices 101A-101C may collectively or individually be referred to as mobile devices 101 or mobile device 101, respectively. The user of mobile device 101 may also be referenced herein as user 101.

Mobile device 101 may be any mobile computing device, including, but not limited to, a mobile phone, a cellular phone, a smartphone, a personal digital assistance (PDA), a gaming unit, a portable computing unit, a tablet personal computer and the like, configured with the capability of connecting to network 103 and consequently communicating with other mobile devices 101 and customer analytics system 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Customer analytics system 102 is configured to identify the geographic market share of the target business as well its competitors based in part on acquiring "mobility data" from applications running on mobile devices 101. "Mobility data," as used herein, refers to data pertaining to the movement of the user of mobile device 101, such as within a geographic area, thereby learning which stores are visited by the user within a certain geographic area, including the time at which such stores are visited, the duration of time spent at each store and even when such stores are visited in light of the weather at the time of visitation (can be obtained from various databases or websites that provide weather information). In one embodiment, such mobility data is anonymous.

In identifying the geographic market share of the target business as well its competitors, customer analytics system 102 may utilize other data in addition to mobility data, such as location data (location of the target business and its competitors), customer data from the target business, demographic data (e.g., American Community Survey (ACS)/census data), locations of interest data (e.g., locations that are of interest to a customer, such as a user of mobile device 101, that may be directly or indirectly provided by the target business), etc. Such data may be stored in a database(s) 104 accessible by customer analytics system 102. While FIG. 1 illustrates a single database, multiple databases may be utilized to store such information. Furthermore, such information may be stored in various databases at various locations that is controlled or maintained by different entities.

Additionally, while FIG. 1 illustrates customer analytics system 102 as a stand-alone system, customer analytics system 102 may be part of other systems, such as a social network server, which may be a web server configured to offer a social networking and/or microblogging service. A description of an embodiment of a hardware configuration of customer analytics system 102 is provided below in connection with FIG. 2.

A further discussion regarding identifying the geographic market share of the target business as well its competitors is provided below in connection with FIGS. 3-5, 6A-6B and 7.

System 100 is not to be limited in scope to any one particular network architecture. System 100 may include any number of mobile devices 101, customer analytics systems 102, networks 103 and databases 104.

Figure 2:
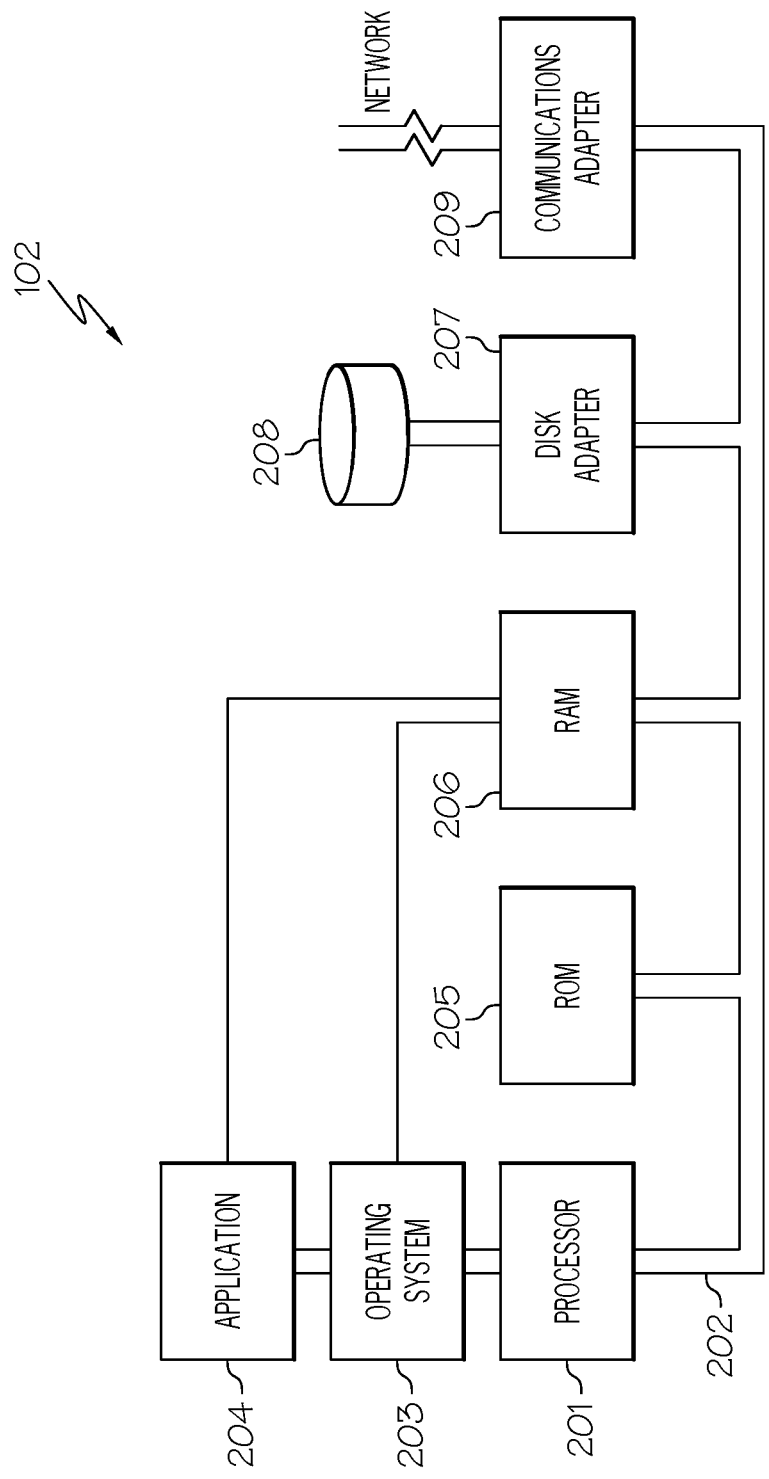
FIG. 2 illustrates a hardware configuration of a customer analytics system for practicing the principles of the present invention in accordance with an embodiment of the present invention.

Referring now to FIG. 2, FIG. 2 illustrates a hardware configuration of customer analytics system 102 (FIG. 1) which is representative of a hardware environment for practicing the present invention. Referring to FIG. 2, customer analytics system 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for identifying the geographic market share of the target business as well its competitors as discussed further below in connection with FIGS. 3-5, 6A-6B and 7.

Referring again to FIG. 2, read-only memory ("ROM") 205 is coupled to system bus 202 and includes a basic input/output system ("BIOS") that controls certain basic functions of customer analytics system 102. Random access memory ("RAM") 206 and disk adapter 207 are also coupled to system bus 202. It should be noted that software components including operating system 203 and application 204 may be loaded into RAM 206, which may be customer analytics system's 102 main memory for execution. Disk adapter 207 may be an integrated drive electronics ("IDE") adapter that communicates with a disk unit 208, e.g., disk drive. It is noted that the program for identifying the geographic market share of the target business as well its competitors, as discussed further below in connection with FIGS. 3-5, 6A-6B and 7, may reside in disk unit 208 or in application 204.

Customer analytics system 102 further includes a communications adapter 209 coupled to bus 202. Communications adapter 209 interconnects bus 202 with an outside network (e.g., network 103 of FIG. 1) thereby allowing customer analytics system 102 to communicate with other devices, such as mobile devices 101.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in connection with market share analysis (indicating how well a business is doing in the marketplace compared to its competitors), customer analytics systems utilize various factors to help estimate the value of the market share, such as unit or dollar sales, user base (piracy and brand switching effect), market definition (scope of definitions), the scope of the denominator (which other brands included), time frame length and product definition (brand, product line or strategic business unit). In particular, current customer analytics systems mainly rely upon surveys and transaction data to estimate the value of the market share, which is very computation intensive. Furthermore, surveys are very time-intensive to prepare and analyze and subject to human error. Such market share analysis performed by customer analytics systems though fails to provide the business an understanding of their competitors' customers and sales, both demographically and geographically. Furthermore, such analysis fails to provide the business an understanding of the amount of overlap of their own customers with their competitors' customers geographically. That is, current customer analytics systems fail to provide a business a complete understanding of its geographic market share. Such information is valuable to a business in order to possibly identify new business opportunities. Currently, customer analytics systems expend an inordinate amount of computing resources (e.g., processing resources) in attempting to identify new business opportunities using standard market share analysis discussed above, due in part, to the substantial reliance upon surveys and transaction data, which are computation intensive, to perform a market share analysis. Furthermore, current customer analytics systems fail to provide the business an understanding of its geographic market distribution and its competitors despite utilizing an excessive amount of computing resources.

Figure 3:
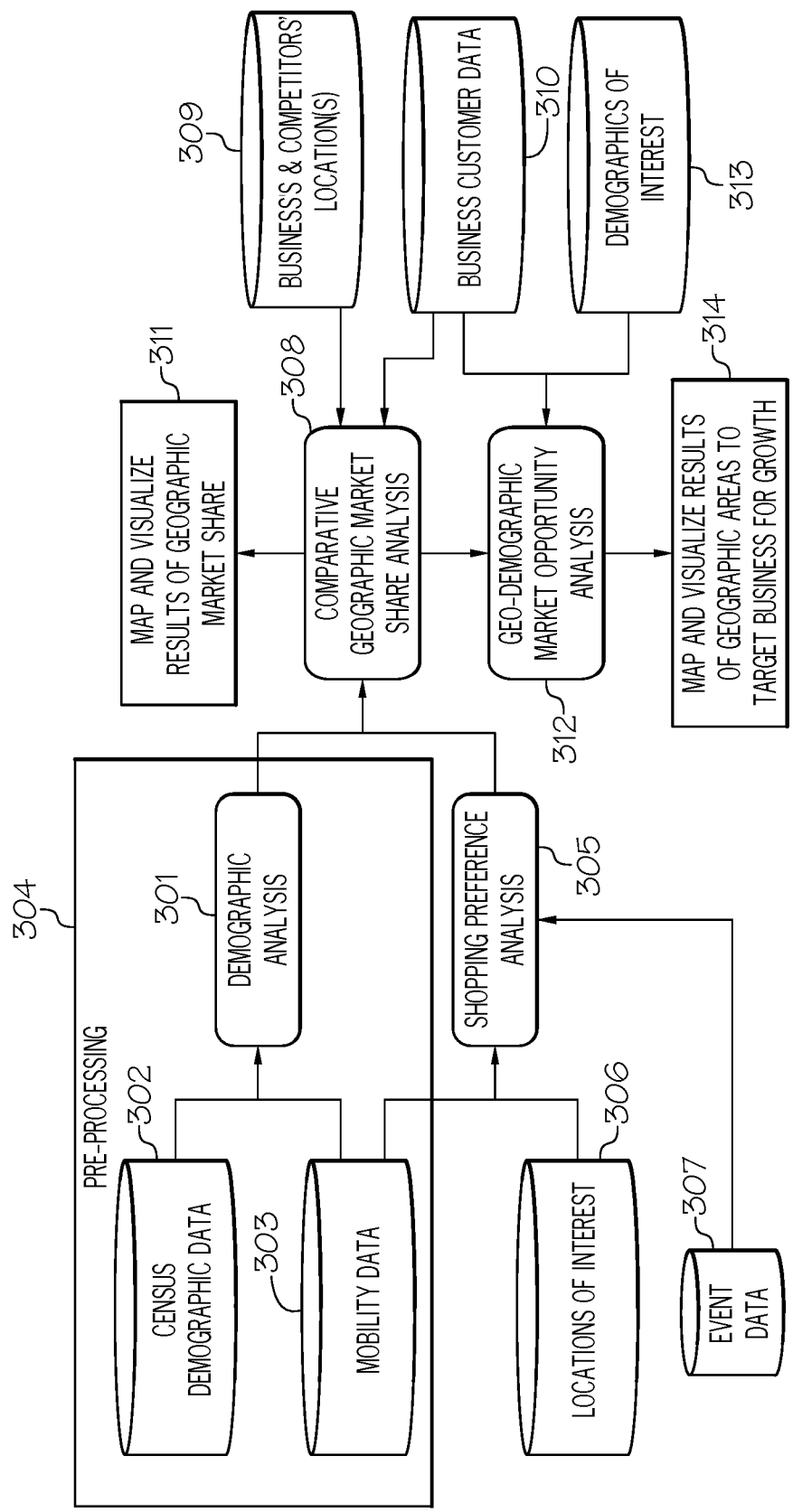
FIG. 3 is a diagram of the software components used for identifying the geographic market share of the target business as well as its competitors in accordance with an embodiment of the present invention.
Figure 4:
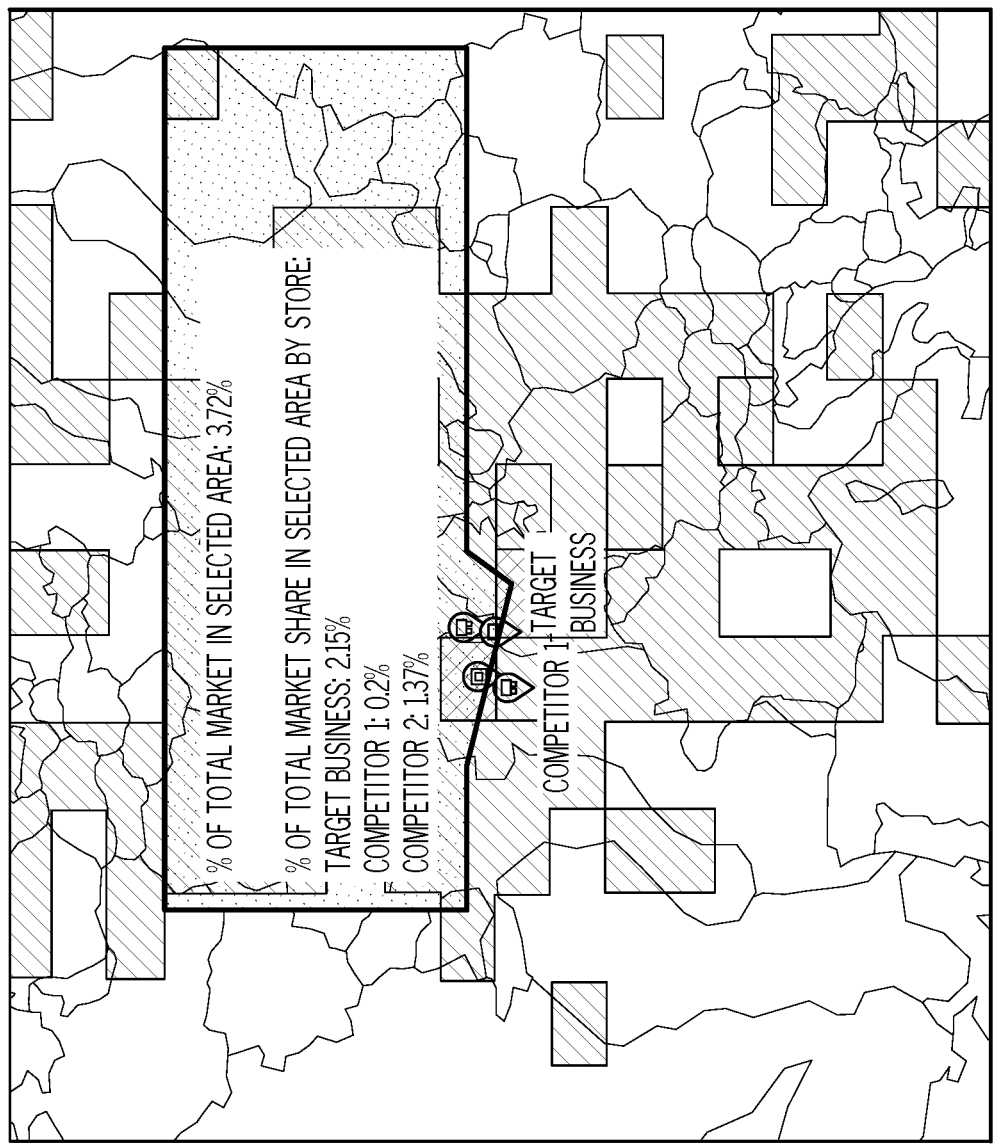
FIG. 4 illustrates a visualization of the determined geographic market share of the target business and its competitors within a geographic area in accordance with an embodiment of the present invention.
Figure 5:
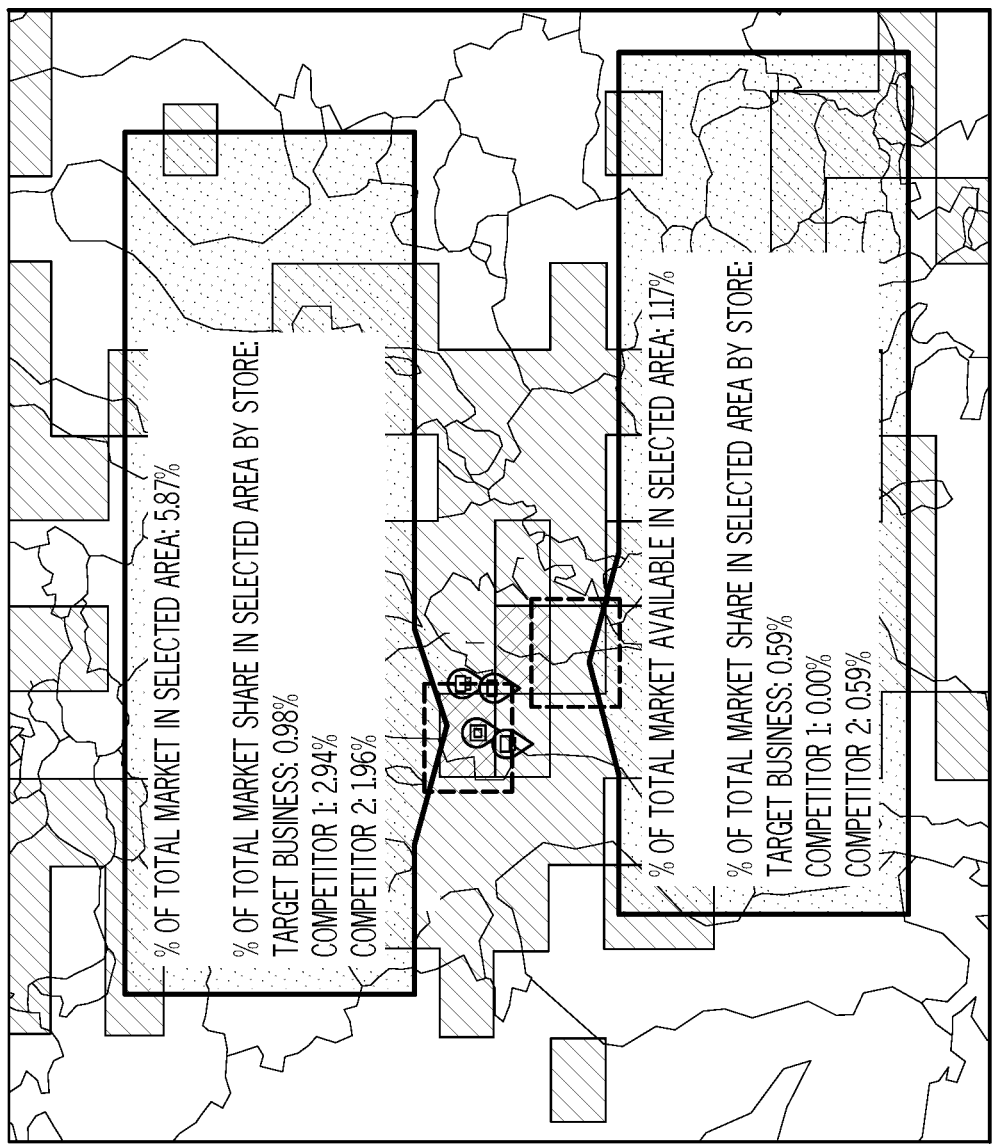
FIG. 5 is a visualization of geographic areas for market opportunities for the target business in accordance with an embodiment of the present invention.
Figure 6A:
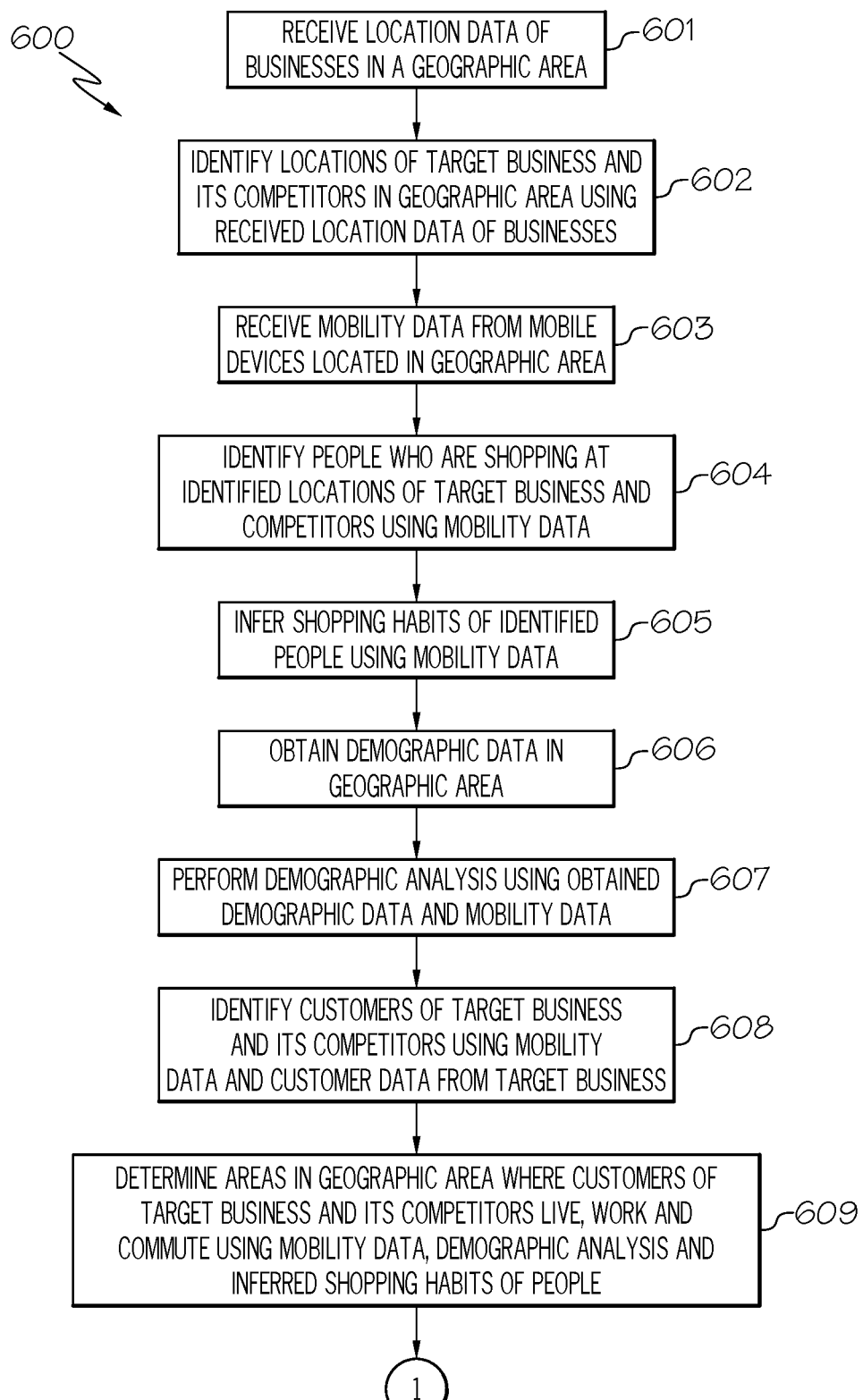
FIGS. 6A-6B are a flowchart of a method for identifying the geographic market share of the target business and its competitors within a geographic area in accordance with an embodiment of the present invention.
Figure 6B:
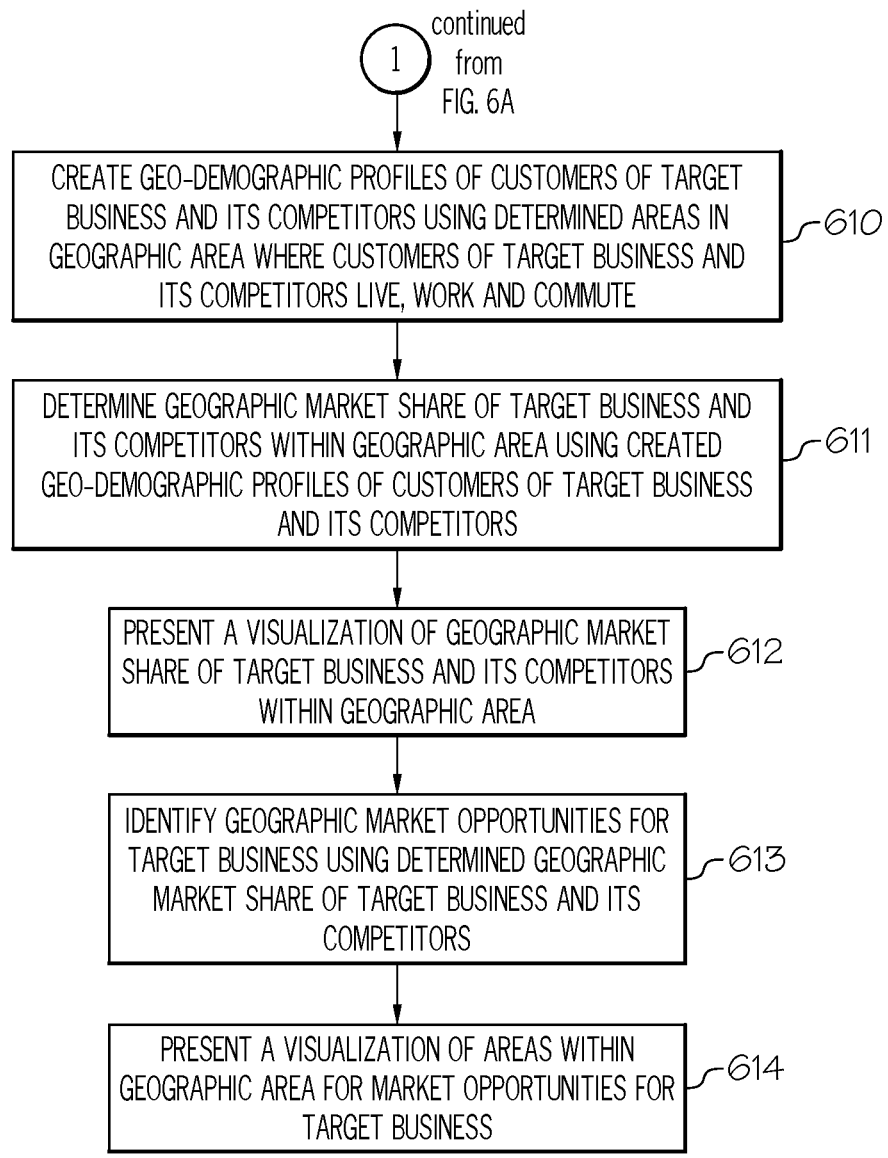
Figure 7:
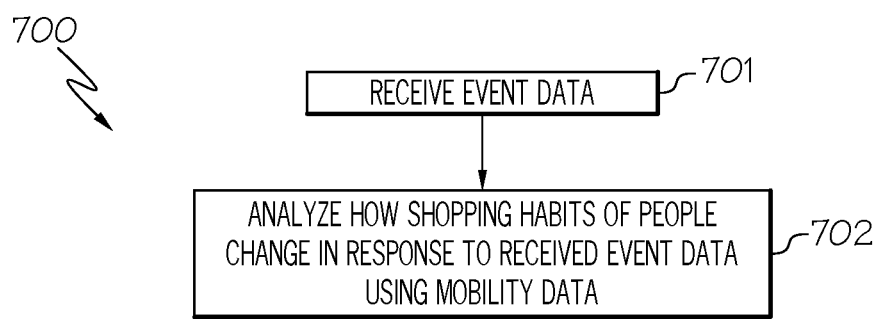
FIG. 7 is a flowchart of a method for determining how shopping habits of people change in response to events in accordance with an embodiment of the present invention.

The principles of the present invention provide a target business an understanding of the target's and its competitors' geographic market distribution using mobility data as discussed below in connection with FIGS. 3-5, 6A-6B and 7. FIG. 3 is a diagram of the software components used for identifying the geographic market share of the target business as well as its competitors. FIG. 4 illustrates a visualization of the determined geographic market share of the target business and its competitors within a geographic area. FIG. 5 is a visualization of geographic areas for market opportunities for the target business. FIGS. 6A-6B are a flowchart of a method for identifying the geographic market share of the target business and its competitors within a geographic area. FIG. 7 is a flowchart of a method for determining how shopping habits of people change in response to events.

As stated above, FIG. 3 is a diagram of the software components used for identifying the geographic market share of the target business and its competitors within a geographic area in accordance with an embodiment of the present invention. In one embodiment, these software components may reside in application 204 (FIG. 2).

The following provides a brief description of these software components. A more detailed description of these software components, including their functionalities, is provided below in conjunction with FIGS. 4-5, 6A-6B and 7.

Referring to FIG. 3, the software components include module 301 directed to performing a demographic analysis. "Demographic analysis," as used herein, refers to correlating the mobility of human populations to the statistical characteristics (e.g., income, employment) of those same human populations in terms of geographic areas. In one embodiment, such an analysis is performed using census demographic data 302, such as the American Community Survey (ACS) from the United States Census Bureau, and mobility data 303. "Mobility data," as used herein, refers to data pertaining to the movement of the user of mobile device 101, such as within a geographic area, thereby learning which stores are visited by the user within a certain geographic area, including the time at which such stores are visited, the duration of time spent at each store and even when such stores are visited in light of the weather at the time of visitation (can be obtained from various databases or websites that provide weather information). In one embodiment, the mobility data is acquired from applications (e.g., location tracking applications) running on mobile devices 101. In one embodiment, the mobility data may be individualized or aggregated. In one embodiment, the mobility data is anonymous.

In one embodiment, module 301 performs the demographic analysis in a pre-processing step 304 to prepare the data for further processing.

In one embodiment, module 301 generates a geohash expression using an alphanumeric string. A geohash is a convenient way of expressing a location using the alphanumeric string, with greater precision obtained with longer strings. In one embodiment, the geohash is generated by module 301 by compiling multiple related variables into aggregated variables. In one embodiment, module 301 aggregates the smaller geographic areas (obtained from census demographic data 302) into larger areas as necessary.

The software components further include module 305 directed to performing a shopping preference analysis to determine the shopping habits of people. For example, module 305 performs an analysis attempting to answer questions directed to the shopping habits of people, such as do customers shop at just 1 grocery store or make multiple stops?, do customers shop close to home/work or go out of their way for certain stores? or do customers prefer to shop on a certain day of the week or time of day? In one embodiment, these preferences are aggregated into a geohash.

In one embodiment, module 305 utilizes mobility data 303 and locations of interest data 306. "Locations of interest," as used herein, refers to the locations of the target business (business whose geographic market share is to be determined) and its competitors. In one embodiment, such data is obtained through a combination of publicly available application programming interfaces (APIs) and strategic partnerships.

In connection with performing the shopping preference analysis, module 305 identifies the target business's and its competitors' locations using locations of interests data 306. Furthermore, module 305 utilizes mobility data 303 to identify people (users of mobile devices 101) who are shopping at the identified locations. For example, a user may be identified as shopping at the target business at a particular location at a particular day and time based on the location tracking application running on mobile device 101 informing customer analytics system 102 the user's current location as well as the identity of the user.

Furthermore, module 305 infers the shopping habits of these identified people using the mobile data, such as the time of day the person visited an identified location, the day of the week the person visited an identified location, the series of locations visited by the person, etc. In one embodiment, such learned shopping habits may be aggregated to a particular geographic area.

In one embodiment, an analysis may be performed by module 305 as to how the shopping habits of people change in response to events 307 (e.g., snowstorm, thunderstorm, large social event, such as the World Series, etc.).

Furthermore, the software components include module 308 for performing the comparative geographic market share analysis. As used herein, the "comparative geographic market share analysis" refers to determining the geographic market share of the target business and its competitors. In one embodiment, module 308 performs such an analysis using the demographic analysis and shopping preference analysis discussed above as well as using the target business's and its competitors' location(s) data 309 and the target business's customer data 310. In one embodiment, the target business's and its competitors' location(s) data 309 is supplied by the target business or is acquired via publicly accessible APIs or strategic partnerships. In one embodiment, the target business's customer data 310 is provided by the target business. Such data includes information pertaining to the customer's name, age, address, purchase cycle, average basket size, demographics (e.g., level of education, household income, children, etc.), time of day person went shopping, etc.

In one embodiment, module 308 identifies the customers of the target business and its competitors using mobility data 303 and customer data 310. For example, mobility data 303 may indicate that a particular user shops every week at the target business at 5:00 pm on Friday which is correlated with customer data 310, which provides the name, address, etc. of a customer who shops at the target business at 5:00 pm on Friday every week. In another example, such customer may be identified as also shopping at a competitor's location on Thursday based on mapping the customer's mobility data 303 with customer data 310.

Furthermore, in one embodiment, module 308 determines the geographic area where customers of the target business and its competitors live, work and commute using mobility data 303, demographic analysis 301 and inferred shopping habits of people 305. For example, the majority of the customers of the target business may generally live, work and commute within ten (10) miles of the location of the target business.

Additionally, in one embodiment, module 308 creates geo-demographic profiles of the customers for the target business and its competitors using the determined geographic areas where the customers live, work and commute. Such geo-demographic profiles include various information about customers, such as name, address, age, what they buy, where they buy in such geographic areas (where customer live, work and commute), how they pay, time of day person went shopping, household income, level of education, household size, etc.

Module 308 determines the geographic market share of the target business and its competitors within a geographic area using the created geo-demographic profiles of the customers for the target business and its competitors. A visualization 311, as shown in FIG. 4, may be presented to a user to illustrate the geographic market share of the target business and its competitors within the geographic area.

Referring to FIG. 4, FIG. 4 illustrates a visualization of the determined geographic market share of the target business and its competitors within a geographic area in accordance with an embodiment of the present invention.

As shown in FIG. 4, the percentage of the total market in the selected area is 3.72%. Furthermore, FIG. 4 illustrates that the target business has 2.15% of the total market in the selected area; whereas, competitor 1 has 0.2% of the total market in the selected area and competitor 2 has 1.37% of the total market in the selected area. Furthermore, FIG. 4 illustrates the demographics for the area as well as the shopper preferences for the target business. All of this information shown in FIG. 4 may be provided by module 308.

Returning to FIG. 3, another software component is module 312 configured to perform the geo-demographic market opportunity analysis. The "geo-demographic market opportunity analysis," as used herein, refers to identifying geographic market opportunities for the target business using the determined geographic market share of the target business and its competitors.

In one embodiment, module 312 uses customer data 310 and demographics of interest data 313 (e.g., household income), which may be provided by the target business, to perform the geo-demographic market opportunity analysis.

In one embodiment, module 312 identifies the geographic areas where the target business has a strong, moderate and weak market share. For example, module 312 may use mobility data 303 to determine geohashes where the target business's customers live, work or commute. Furthermore, the customers' home is determined to establish demographic and preference profiles. The mobility data 303 may be supplemented with the target business's own customer data which is used to train a model of the geographic profile for the target business location. Such a model is used to identify the geohashes where the target business has a strong, moderate and weak market share.

Furthermore, module 312 identifies the target business's moderate and weak geographic areas that contain similar live/work/commute profiles as the geographic areas where the target business has a strong market share. Within such geographic areas (geohashes), module 312 may narrow down to the geographic areas (geohashes) with similar demographics and/or shopping habits. Alternatively, module 312 may narrow down to the geographical areas (geohashes) using the business's demographics of interest 313.

After performing the analysis, module 312 may present to a user a visualization 314, such as shown in FIG. 5, of the geographic areas for market opportunities for the target business.

FIG. 5 is a visualization of geographic areas for market opportunities for the target business in accordance with an embodiment of the present invention.

As shown in FIG. 5, the area northwest (NW) of the target business is still close to home to be considered a neighborhood store with a similar demographic profile in terms of age and household/family size as the location shown in FIG. 4. Furthermore, as shown in FIG. 5, the area south (S) of the target business is still close to home to be considered a neighborhood store with a similar demographic profile in terms of age and household/family size as the location shown in FIG. 4.

As also shown in FIG. 5, in the area northwest of the target business, the percentage of the total market in the area is 5.87%. Furthermore, FIG. 5 illustrates that the target business has 0.98% of the total market in the selected area; whereas, competitor 1 has 2.94% of the total market in the selected area and competitor 2 has 1.96% of the total market in the selected area. Furthermore, FIG. 5 illustrates that the percentage of the total market in the area south of the target business is 1.17%. Furthermore, FIG. 5 illustrates that the target business has 0.59% of the total market in the selected area; whereas, competitor 1 has 0% of the total market in the selected area and competitor 2 has 0.59% of the total market in the selected area.

Data discussed above, such as census demographic data 302, locations of interests data 306, event data 307, business's and competitors' location(s) data 309, business customer data 310, and demographics of interests data 313 may be stored in various databases (similar to database 104 shown in FIG. 1) which are accessible by customer analytics system 102.

A further discussion of customer analytics system 102 identifying the geographic market share of the target business and its competitors within a geographic area is provided below in connection with FIGS. 6A-6B.

FIGS. 6A-6B are a flowchart of a method 600 for identifying the geographic market share of the target business and its competitors within a geographic area in accordance with an embodiment of the present invention.

Referring to FIG. 6A, in conjunction with FIGS. 1-5, in step 601, customer analytics system 102 receives location data of businesses (target business and its competitors) 309 in a geographic area. In one embodiment, the target business's and its competitors' location(s) data 309 is supplied by the target business or is acquired via publicly accessible APIs or strategic partnerships.

In step 602, customer analytics system 102 identifies the locations of the target business and its competitors in the geographic area using the received location data of businesses 309.

In step 603, customer analytics system 102 receives mobility data 303 from mobile devices 101 located in the geographic area. "Mobility data," as used herein, refers to data pertaining to the movement of the user of mobile device 101, such as within a geographic area, thereby learning which stores are visited by the user within a certain geographic area, including the time at which such stores are visited, the duration of time spent at each store and even when such stores are visited in light of the weather at the time of visitation (can be obtained from various databases or websites that provide weather information). In one embodiment, the mobility data is acquired from applications (e.g., location tracking applications) running on mobile devices 101. In one embodiment, the mobility data may be individualized or aggregated. In one embodiment, the mobility data is anonymous.

In step 604, customer analytics system 102 identifies people who are shopping at the identified locations for the target business and its competitors using mobility data 303. As discussed above, module 305 is configured to perform a shopping preference analysis to determine the shopping habits of people, which includes identifying people who are shopping at the identified locations for the target business and its competitors using mobility data 303.

In step 605, customer analytics system 102 infers shopping habits of the identified people using mobility data 303. As discussed above, module 305 is configured to perform a shopping preference analysis to determine the shopping habits of people, which includes inferring the shopping habits of the identified people using mobility data 303, such as the time of day the person visited an identified location, the day of the week the person visited an identified location, the series of locations visited by the person, etc. In one embodiment, such learned shopping habits may be aggregated to a particular geographic area.

In step 606, customer analytics system 102 obtains census demographic data 302 in the geographic area. In one embodiment, census demographic data 302, such as the American Community Survey (ACS), is obtained from the United States Census Bureau.

In step 607, customer analytics system 102 performs a demographic analysis, including generating a geohash expression, using the obtained demographic data 302 and mobility data 303. "Demographic analysis," as used herein, refers to correlating the mobility of human populations to the statistical characteristics (e.g., income, employment) of those same human populations in terms of geographic areas. As discussed above, in one embodiment, module 301 generates a geohash expression using an alphanumeric string. A geohash is a convenient way of expressing a location using the alphanumeric string, with greater precision obtained with longer strings. In one embodiment, the geohash is generated by module 301 by compiling multiple related variables into aggregated variables. In one embodiment, module 301 aggregates the smaller geographic areas (obtained from census demographic data 302) into larger areas as necessary.

In step 608, customer analytics system 102 identifies customers of the target business and its competitors using mobility data 303 and customer data 310 from the target business. As discussed above, module 308 performs a comparative geographic market share analysis. As used herein, the "comparative geographic market share analysis" refers to determining the geographic market share of the target business and its competitors. In connection with performing such an analysis, module 308 identifies the customers of the target business and its competitors using mobility data 303 and customer data 310.

In step 609, customer analytics system 102 determines the areas in the geographic area where the customers of the target business and its competitors live, work and commute using mobility data 303, demographic analysis (see module 301) and inferred shopping habits of people (see module 305). As discussed above, module 308 performs a comparative geographic market share analysis. In connection with performing such an analysis, module 308 determines the geographic area where customers of the target business and its competitors live, work and commute using mobility data 303, demographic analysis 301 and inferred shopping habits of people 305.

Referring now to FIG. 6B, in conjunction with FIGS. 1-5, in step 610, customer analytics system 102 creates geo-demographic profiles of the customers of the target business and its competitors using the determined areas in the geographic area where the customers of the target business and its competitors live, work and commute. As discussed above, module 308 performs a comparative geographic market share analysis. In connection with performing such an analysis, module 308 creates geo-demographic profiles of the customers for the target business and its competitors using the determined geographic areas where the customers live, work and commute.

In step 611, customer analytics system 102 (module 308) determines the geographic market share of the target business and its competitors within the geographic area using the created geo-demographic profiles of the customers of the target business and its competitors.

In step 612, customer analytics system 102 presents a visualization of the geographic market share of the target business and its competitors within the geographic area as shown in FIG. 4.

In step 613, customer analytics system 102 identifies geographic market opportunities for the target business using the determined geographic market share of the target business and its competitors. As discussed above, module 312 is configured to perform the geo-demographic market opportunity analysis. The "geo-demographic market opportunity analysis," as used herein, refers to identifying geographic market opportunities for the target business using the determined geographic market share of the target business and its competitors. In one embodiment, module 312 uses customer data 310 and demographics of interest data 313 (e.g., household income), which may be provided by the target business, to perform the geo-demographic market opportunity analysis. Such an analysis may be used by the target business for future store placement or marketing targeted to a specific geographic area.

In step 614, customer analytics system 102 presents a visualization of areas within the geographic area for market opportunities for the target business as shown in FIG. 5.

After customer analytics system 102 determines the geographic market share of the target business and its competitors within the geographic area, changes to such market share may be analyzed in response to events 307, such as a snowstorm, a thunderstorm, a large social event, such as the World Series, etc., as discussed below in connection with FIG. 7.

FIG. 7 is a flowchart of a method 700 for determining how shopping habits of people change in response to events in accordance with an embodiment of the present invention.

Referring to FIG. 7, in conjunction with FIGS. 1-5 and 6A-6B, in step 701, customer analytics system 102 receives event data 307.

In step 702, customer analytics system 102 analyzes how shopping habits of people change in response to the received event data 307 using mobility data 303. As discussed above, an analysis may be performed by module 305 as to how the shopping habits of people change in response to events 307 (e.g., snowstorm, thunderstorm, large social event, such as the World Series, etc.). That is, customer analytics system 102 compares typical visitor behavior with behavior before, during, and after events. This comparison can then be used to predict behavior changes for similar events in the future.

For example, weather data can be used to predict how visitors will change their shopping habits in response to a blizzard. There are many other types of weather events that can be predicted and may impact consumer behavior: heat waves, fog, thunder storms, etc. It should be noted that the degree of impact of a given weather event may vary greatly by geographic area. In one embodiment, a geographic comparative analysis would also be part of the analysis performed by customer analytics system 102.

In another example, customer analytics system 102 uses the schedule of a local arena to predict foot traffic changes for a large sporting event. In yet another example, customer analytics system 102 uses construction schedules to predict route changes in response to construction. Other examples of events include marathons, parades, large festivals, fairs, etc.

In this manner, the present invention enhances businesses' understanding of its geographic market share using mobility data to determine where customers live, work and commute. Furthermore, the present invention improves the businesses ability to identify consumer preferences and demographic shifts within the businesses' geographic area of influence. Additionally, the present invention breaks down the analysis by different dimensions, such as the day of the week or time of day.

As discussed above, the present invention uses mobility data from mobile devices to identify geographic market share thereby lessening the reliance upon survey or transaction data as used by current customer analytics systems. As a result, the present invention is able to emphasize geographic areas rather than specific users, focus on geographic market share of existing business locations rather than placement of new locations and identify geographic market opportunities based on the analyses discussed herein.

Furthermore, as discussed above, current customer analytics systems utilize an inordinate amount of computing resources (e.g., processing resources) to generate a target business's geographic market share due to the fact that they mainly rely upon computation intensive survey or transaction data. The present invention provides a technological solution to this technical problem by utilizing mobility data with less reliance on survey or transaction data. By utilizing mobility data, the present invention enhances businesses' understanding of its geographic market share using fewer computing resource (e.g., processing resources). Furthermore, by utilizing mobility data, the present invention provides the target business an understanding of their competitors' customers and sales, both demographically and graphically, as well as provide the target business an understanding of the amount of overlap of their own customers with their competitors' customers graphically. Such an understanding is not possible by simply relying upon surveys and transaction data. Additionally, less computing resources need to be utilized by the customer analytics system since the present invention derives geographic market share using mobility data with less reliance on survey or transaction data, which are computation intensive.

Furthermore, the present invention improves the technology or technical field involving customer analytics systems. Currently, such systems fail to provide the business an understanding of their competitors' customers and sales, both demographically and geographically. Furthermore, such systems fail to provide the business an understanding of the amount of overlap of their own customers with their competitors' customers geographically. That is, current customer analytics systems fail to provide a business a complete understanding of its geographic market share. Such information is valuable to a business in order to possibly identify new business opportunities. The present invention improves such technology by utilizing mobility data to enhance businesses understanding of its geographic market share as discussed above, such as enhancing their understanding of their competitors' customers and sales, both demographically and geographically, as well as enhancing their understanding of the amount of overlap of their own customers with their competitors' customers geographically.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying a geographic market share, the method comprising:
    receiving, by a customer analytics system, location data of businesses in a geographic area, wherein said businesses comprise a target business and one or more competitors of said target business;
    identifying, by said customer analytics system, locations of said target business and said one or more competitors in said geographic area using said received location data of businesses;
    receiving, by said customer analytics system, mobility data from a plurality of mobile devices located in said geographic area, wherein said plurality of mobile devices are connected to said customer analytics system via a network;
    identifying, by said customer analytics system, people who are shopping at said identified locations of said target business and said one or more competitors using said mobility data;
    inferring, by said customer analytics system, shopping habits of said identified people using said mobility data;
    identifying, by said customer analytics system, customers of said target business and said one or more competitors using said mobility data and customer data from said target business;
    determining, by said customer analytics system, areas in said geographic area where said customers of said target business and said one or more competitors live, work and commute using said mobility data and said inferred shopping habits of said identified people;
    creating, by said customer analytics system, geo-demographic profiles of said customers of said target business and said one or more competitors using said determined areas in said geographic area where said customers of said target business and said one or more competitors live, work and commute;
    determining, by said customer analytics system, geographic market share of said target business and said one or more competitors within said geographic area using said created geo-demographic profiles of customers of said target business and said one or more competitors; and
    displaying, by said customer analytics system, a visualization of said geographic market share of said target business and said one or more competitors within said geographic area on a user's computing device thereby enhancing businesses' understanding of its geographic market share using mobility data as well as enhancing their understanding of an amount of overlap of their own customers with their competitors' customers geographically, wherein said visualization comprises a graphical display of said geographic market share of said target business and said one or more competitors surrounding indications of locations of said target business and said one or more competitors within said geographic area, wherein said visualization is displayed by a software module of said customer analytics system configured to perform comparative geographic market share analysis, wherein said visualization comprises a box of information overlaid on a map of said geographic area, wherein said box of information comprises a percentage of total market in said geographic area, wherein said box of information comprises a percentage of total market share in said geographic area by store for said target business and said one or more competitors, wherein said box of information is derived from said determined geographic market share of said target business and said one or more competitors within said geographic area.

2. The method as recited in claim 1 further comprising:
obtaining demographic data in said geographic area;
    performing demographic analysis using said obtained demographic data and said mobility data; and
    determining areas in said geographic area where said customers of said target business and said one or more competitors live, work and commute using said mobility data, said performed demographic analysis and said inferred shopping habits of said identified people.

3. The method as recited in claim 1 further comprising:
aggregating said inferred shopping habits to said geographic area via a geohash expression.

4. The method as recited in claim 1 further comprising:
identifying geographic market opportunities for said target business using said geographic market share of said target business and said one or more competitors.

5. The method as recited in claim 4 further comprising:
presenting a visualization of areas within said geographic area for said geographic market opportunities for said target business.

6. The method as recited in claim 1 further comprising:
receiving event data; and
analyzing how said shopping habits of said identified people change in response to said received event data using said mobility data.

7. The method as recited in claim 1, wherein said mobility data is acquired from location tracking applications running on mobile devices.

* * * * *